Figure 4:
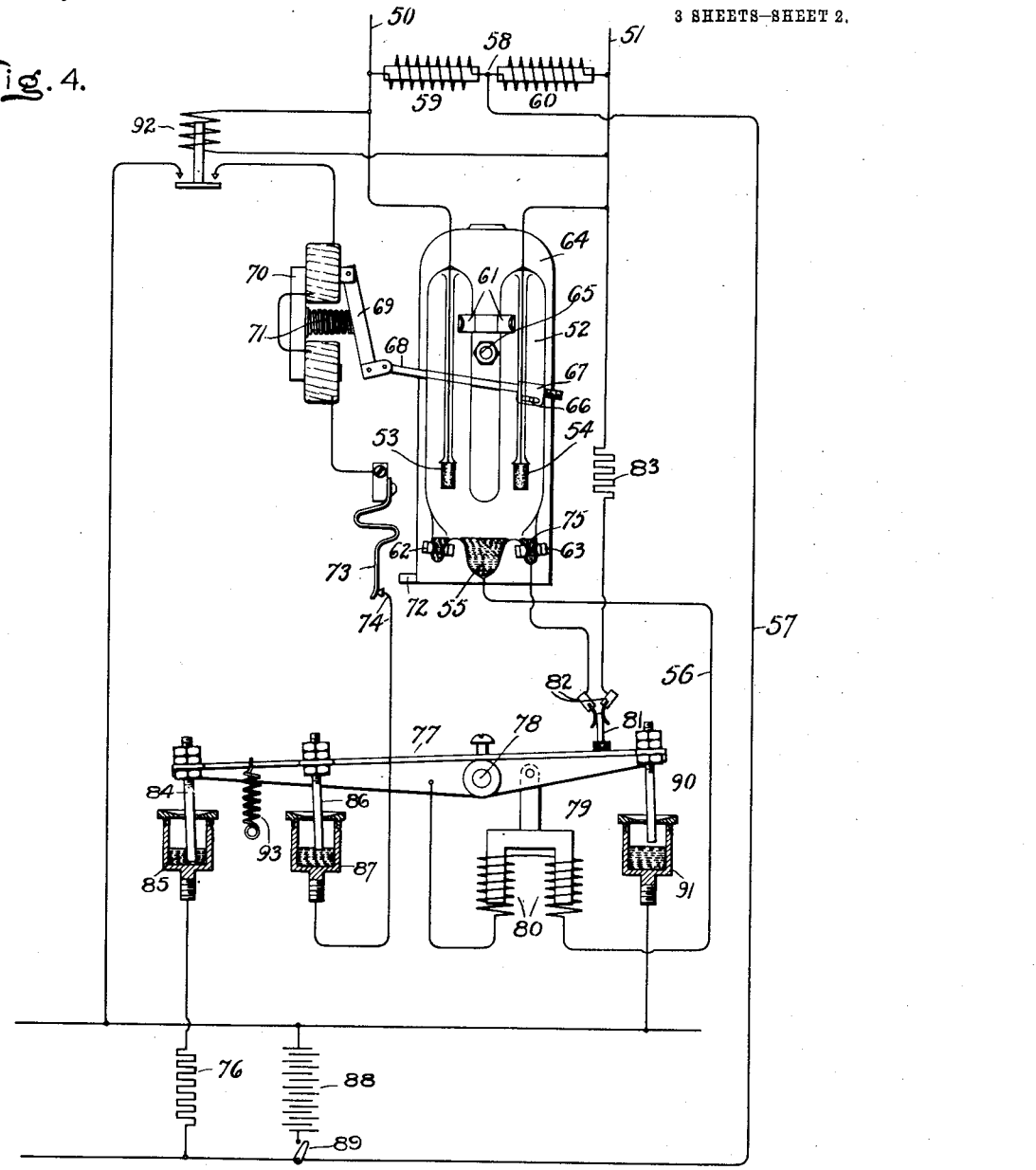

A. CHURCHWARD.
VAPOR ELECTRIC APPARATUS.
APPLICATION FILED JAN. 18, 1904.
1,094,778.
Patented Apr. 28, 1914.
3 SHEETS—SHEET 1.
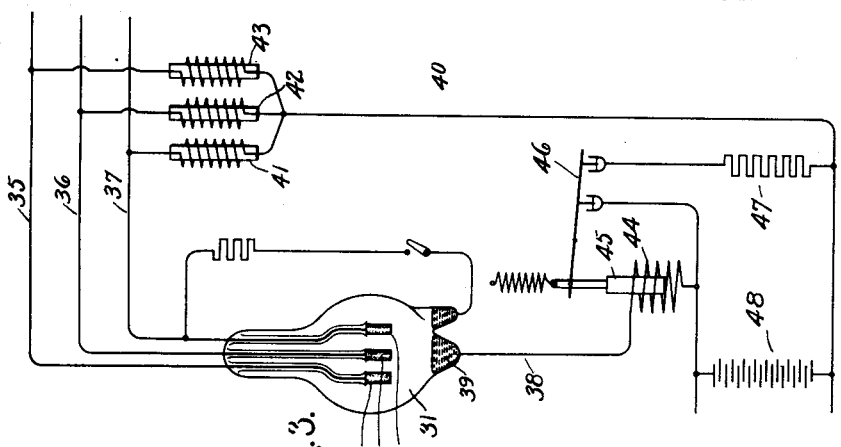
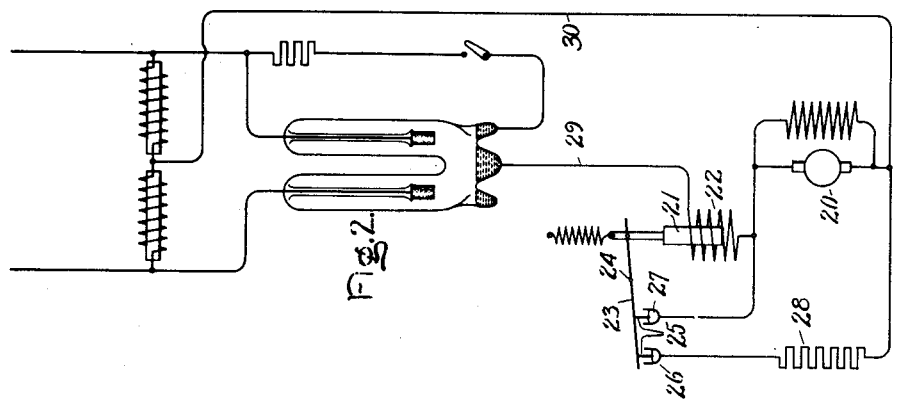
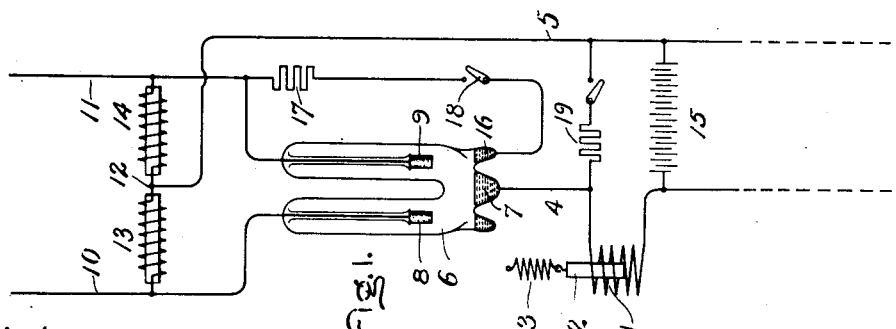
WITNESSES:
George N. Thornton
Helen Orford
INVENTOR:
Alexander Churchward,
by Albert S. Davis
Atty.

A. CHURCHWARD.
VAPOR ELECTRIC APPARATUS.
APPLICATION FILED JAN. 18, 1904.

1,094,778.

Patented Apr. 28, 1914.

WITNESSES:
George A. Thornton.

INVENTOR:
Alexander Churchward,
by Albert G. Davis
Att'y.

A. CHURCHWARD.
VAPOR ELECTRIC APPARATUS.
APPLICATION FILED JAN. 18, 1904.

1,094,778.

Patented Apr. 28, 1914.
3 SHEETS—SHEET 3.

WITNESSES:
George A. Thornton
Helen Alford

INVENTOR:
Alexander Churchward,
by
Att'y.

UNITED STATES PATENT OFFICE.

ALEXANDER CHURCHWARD, OF NEW YORK, N. Y., ASSIGNOR TO GENERAL ELECTRIC COMPANY, A CORPORATION OF NEW YORK.

VAPOR ELECTRIC APPARATUS.

1,094,778.  Specification of Letters Patent.  Patented Apr. 28, 1914.

Application filed January 18, 1904. Serial No. 189,464.

*To all whom it may concern:*

Be it known that I, ALEXANDER CHURCHWARD, a citizen of the United States, residing at New York, county of New York, State of New York, have invented certain new and useful Improvements in Vapor Electric Apparatus, of which the following is a specification.

My invention comprises more especially an arrangement for starting and controlling vapor electric devices such as rectifiers or the like. In rectifiers of this character, in which rectification is effected through the instrumentality of a vapor path having a low resistance to current flow in one direction and an extremely high resistance in the opposite direction, certain difficulties sometimes arise where the rectified current is used for charging storage batteries, running electric motors, or for other purposes where the current-consuming device offers a counter-electromotive force. When this counter-electromotive force increases abnormally for any reason, as for example in the case of a storage battery when a condition of gassing occurs, the current from the rectifier may fall so low as to cause the rectifier to cease operating. I have found that interruption of the operation of the rectifier may be prevented by suitably varying the load in the consumption circuit whenever this action starts to take place. This result I effect, in the case of the storage battery, by providing a resistance which is connected in multiple with the battery immediately upon the occurrence of a drop in current to a sufficiently low value. The storage battery then discharges through the resistance. The gassing being thus relieved, the voltage of the battery drops, the current in the rectified circuit is increased, and the resistance is then cut out of circut. In practice a momentary connection of the resistance in circuit I find is sufficient to secure stable operation of the rectifier when feeding a storage battery. The tendency to instability, I may remark, may be reduced by charging the battery with a resistance in series therewith. This, however, is obviously wasteful and may be avoided by the use of my invention.

My invention also comprises certain improvements whereby the rectifier may be started into operation and, if it ceases to operate, whereby it will be automatically restarted. I thus provide against any unlooked for interruption temporary or otherwise in the supply system and thus permit the rectifier to operate continuously or so long as there is a supply of current for the rectifier.

Figure 5:
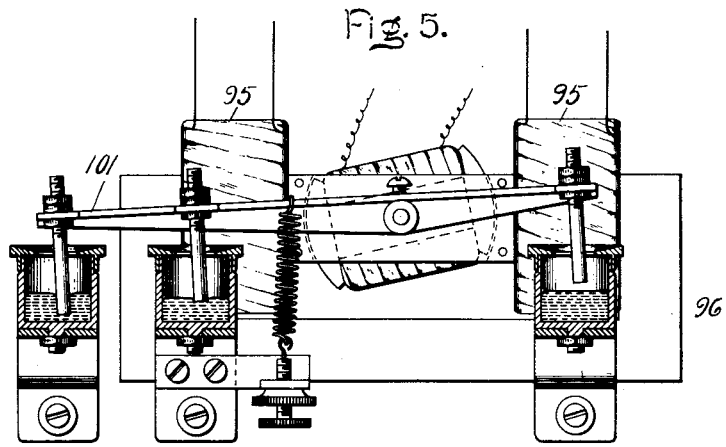
Figure 6:
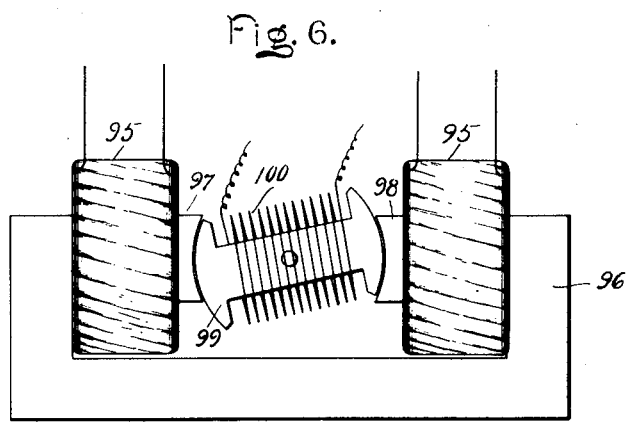

The various features of novelty characteristic to my invention I have pointed out in the appended claims. The invention itself, however, both as to its details of construction and mode of operation will be better understood by reference to the following description taken in connection with the accompanying drawings, in which, Figure 1 represents a reactive device arranged to assist in preserving stability of operation of the rectifier; Fig. 2 shows the reactive device arranged to control a resistance used for steadying purposes; Fig. 3 differs from Fig. 2 only in that the rectifier is of the three-phase type instead of the single-phase; Fig. 4 represents in some detail an organization for starting and controlling a rectifier automatically; and Figs. 5 and 6 show a modified arrangement of a circuit-making and breaking device.

A reactance, or in other words, an inductive resistance, in the direct-current circuit of a vapor rectifier, by opposing sudden fluctuations of current, assists in preserving the rectifier in operation by preventing any merely momentary drops in current value which might otherwise occur. This beneficial effect is particularly apparent if the coil and the core of the inductive resistance are relatively movable. Such an arrangement I have shown in Fig. 1, in which the coil of the inductive resistance is indicated at 1, and the core 2 spring-supported at 3 so as to be drawn into and out of the coil as the current in the coil varies. The coil 1 is connected in the direct-current circuit 4, 5 of the rectifier. The rectifier itself consists of a highly exhausted envelop such, for example, as shown at 6. The cathode or negative mercury electrode 7 is connected to the main 4. The anodes 8 and 9 of artificial graphite or other suitable material are connected in the usual manner to the alternating-current supply mains 10 and 11. The remaining direct-current main 5 is connected to the junction 12 between two inductance coils 13 and 14 in series between the mains 10 and 11. Of course, any desired translating devices may be fed with current from the mains 4 and 5 though for the purpose of illustration I have, for convenience represented but one device, in this case, the storage battery 15.

To start up the rectifier an auxiliary starting electrode 16 connected through a resistance 17 to one of the supply mains may be used in a well known manner. Shaking of the rectifier or tipping causes a temporary flow of mercury between the electrodes 7 and 16 which thereby causes the apparatus to start, whereupon the circuit of the starting electrode 16 may be interrupted by the switch 18. The rectifier may be started on a dead resistance 19 and the circuit then switched over to the battery 15 and the resistance then cut out.

The effect of the inductive resistance 1 with its relatively movable core, although always beneficial to a certain extent, is not in all cases sufficient to preserve the rectifier in continuous operation. I have, therefore, provided means whereby the movement of the core in its coil in response to variation of current, may be caused to effect certain circuit changes whereby the rectifier may not only be controlled while in operation but may be initially started and, in case it subsequently ceases operations, may be automatically restarted.

One of the simpler forms of circuit-controller is shown in Fig. 2, in which the rectifier controlled thereby is indicated as running a motor 20. When such a motor is running light, the current taken thereby, due to the high counter-electromotive force of the motor, may be so low that the arc in the rectifier will go out and the rectifier cease operations. To prevent this the electro-magnetically-actuated core 21, moving in the coil 22, actuates the switch-arm 23 pivoted at 24. This arm carries circuit-closing contacts 25 which, when they engage the mercury cups 26 and 27, close the circuit of a resistance 28 around the motor 20, thus decreasing the total resistance of the direct current circuit. When the current in the circuit 29, 30 corresponding to the circuit 4, 5 of the rectifier in Fig. 1, would be too low to secure stability of operation of the rectifier, the resistance 28 is in circuit to increase the total conductance of the load circuit, while when the current rises above a predetermined value, the core 21 is pulled down and the resistance 28 is open-circuited.

A controlling device practically the same as shown in Fig. 2 is represented in Fig. 3 as applied to the direct-current circuit of a three-phase rectifier 31. This rectifier is provided with anodes 32, 33 and 34 connected respectively to the three-phase supply mains 35, 36 and 37. The main 38 of the direct-current circuit of the rectifier is connected to the cathode 39 and the other main 40 to the junction between three Y-connected inductance coils 41, 42 and 43, the outer ends of which are connected as shown to the supply mains 35, 36 and 37. The coil and core 44 and 45 of the controlling device operate the contact-carrying arm or lever 46 and, in the same manner as described in connection with Fig. 2, control the insertion or exclusion of the resistance 47. Unlike Fig. 2, however, Fig. 3 shows the rectifier as supplying a storage battery 48 instead of a motor.

A more complete embodiment of my invention is shown in Fig. 4 wherein all that is necessary in order to start the rectifier and maintain it in subsequent operation is to close the main supply switch. The starting and subsequent controlling of the apparatus is then accomplished automatically and without further attention on the part of the attendant.

The alternating-current supply mains are indicated conventionally at 50 and 51. The rectifier consists of a highly exhausted U-shaped tube 52 having anodes 53 and 54 connected respectively to these mains. The cathode 55 of the rectifier is connected to one lead 56 of the direct-current consumption circuit while the other lead 57 of the consumption circuit is connected to the junction 58 between two inductance coils 59 and 60 in series across the mains 50 and 51. The rectifier 52 is mounted by means of clips such as at 61, 62 and 63 on a suitable support 64 pivoted above its center of gravity as at 65. This support 64 is connected by a lost-motion device, consisting of a pin 66 moving in a slot in the member 67, to a link or rod 68. This link or rod 68 is pivoted to an armature 69 of an electromagnet 70. A compression spring 71 normally holds the armature in this open position as shown. The magnet 70 when energized rocks the rectifier and its support 64 about the pivot 65. In performing this operation a projection 72 on the lower end of the support 64 engages a spring 73 and moves it out of contact with a terminal 74. This spring and its contact are in circuit with the magnet 70 and thus open the circuit of the latter whereupon the rectifier, through the action of gravity and assisted by the spring 71, swings backward thus closing the circuit at the contact 74 and allowing the operation to be repeated. The shaking of the rectifier thus produced causes a flow of mercury to take place between the cathode 55 and a supplementary starting electrode 75 connected to the same alternating-current supply main as the anode 54. The making and breaking of contact between the bodies of mercury constituting the electrodes 55 and 75 thus causes the rectifier to start.

In order to control the circuits of the shaking magnet 70, the circuit of the starting electrode 75, and the circuit of the steadying resistance 76 corresponding to the resistances 28 and 47 in Figs. 2 and 3 respectively, I make use of the switching device shown at the bottom of Fig. 4. This device consists of a contact-carrying arm or lever 77, pivoted or otherwise suitably supported as at 78, and movable under the influence of a core of magnetic material 79 operated upon by the magnet coils 80. These coils 80 are as shown directly in series with the lead 56 extending from the cathode or negative electrode 55 of the rectifier and are electrically connected to the arm 77. When there is no current in this circuit the parts are in the position indicated. In this position a contact 81 engages two fixed contacts 82 thus closing the circuit of the starting electrode 75 through a resistance 83 to the supply main 51. By means of the contact 84 dipping in the mercury cup 85 the resistance 76 is connected with one end of the lead 57 and the other end through the lever 77 and coils 80 to the lead 56.

The contact 86 dipping in the mercury cup 87 closes the circuit of the magnet 70 through the resistance 76 across the battery 88 to be charged by the rectifier. Except when ready to start the circuit of this battery may be left open by means of a switch 89. The contact 90, which in the position shown is out of engagement with the mercury cup 91, operates when brought into contact, to connect the battery 88 between the leads 56 and 57, and so as to include the coils 80 of the controlling device. Suppose now that the main alternating-current switch be closed, a cut-out device 92 connected across the mains closes a break in the circuit of the magnet 70 and thus enables the battery 88, when the switch 89 is closed, to send current through the magnet 70 and thus cause the rectifier to oscillate about its pivot 65. The path of the current is from the upper end of the battery to the magnet 70, then to the mercury cup 87, across a part of the beam 77 to the other mercury cup 85, and through the resistance 76 to the other terminal of the battery. As soon as the arc starts in the rectifier, rectified current flows through the coils 80 and through the resistance 76 to the lead 57. The lever 77 is thus tilted. The contact 86 is the first to break connection with its mercury cup and thus cuts off current from the shaking magnet 70 and stops the oscillation of the rectifier. The contact 90 then engages the mercury in the cup 91 and connects the battery 88 in multiple with the resistance 76. Further movement of the lever open-circuits the resistance 76. The movement of the lever in its initial stages also withdraws the contact 81 and breaks the circuit of the auxiliary starting electrode 75.

The rectifier is now in normal operation feeding direct current to the battery 88. When the current in the battery circuit falls either suddenly or otherwise to a low value such as to endanger the stability of operation of the rectifier the coils 80 become weaker and the spring 93 moves the lever 77 in the reverse direction until the contact 84 closes the circuit of the resistance 76 and thus puts the resistance in multiple with the battery. In practice I have found that as soon as this connection is made it is almost immediately broken by the increase of current produced in the magnet coils 80. If the voltage of the battery has not been sufficiently reduced by this momentary contact the operation may be repeated with greater or less rapidity until the apparatus commences again to work with stability. In the event however of the rectifier actually ceasing operations the lever 77 will move into the position shown in the drawings and the whole operation of starting is gone through with again. In case of a failure of the alternating-current supply, thus causing the rectifier to stop, the current from the battery 88 would operate the shaking magnet 70, and, since the rectifier under these circumstances would never start, this shaking would tend to go on indefinitely. It is for this reason that I provide the cut-out 92 which interrupts the circuit of the shaking magnet 70 whenever there is no voltage on the alternating-current supply mains.

It is clear that numerous changes may be made in the embodiment of my invention without departing from the spirit thereof; thus, for example, the shaking magnet 70 instead of being supplied from the battery 88 may receive current from any other source as, for example, from the alternating-current mains.

Under certain circumstances it may happen that the battery 88, instead of receiving current from the rectifier, may force current back through the rectifier and thus put the latter out of operation and perhaps cause more or less serious damage to the apparatus. While this is not very likely to happen still in some instances I find it desirable to provide precautionary measures. To prevent this act from taking place I may cause the magnetic actuating device for the lever 77 to be polarized, or, in other words, to be responsive to flow of current in the proper direction and irresponsive to current flow in the opposite direction. Such an arrangement is shown in Figs. 5 and 6. In these figures the coils 95 correspond to the coils 80 in Fig. 4. These coils are mounted on a core 96 having opposing polepieces 97 and 98 between which moves the pivoted armature 99 similar to the well-known Siemens shuttle armature. This armature carries a coil 100 excited by direct current of constant direction supplied from any suitable source, as for example from the battery itself. The pivoted armature actuates a rocking lever 101 carrying circuit-controlling contacts the same as shown in Fig. 4 and, therefore, requires no further description. The armature 99, being thus polarized, will move in response to current of normal direction in the coils 95 but is irresponsive to current in the opposite direction. It will thus be seen that when current in the normal direction from the battery 88 falls to zero in an attempt, so to speak, to reverse, the switch arm 101 will assume the position indicated and will not move in the opposite direction. Thus if the storage battery is connected in the wrong direction the polarized armature will prevent the rectifier from being started.

I have herein shown, described and claimed a shaking or tilting device for starting the rectifier. In accordance with the statute I have shown the best form with which I am acquainted for accomplishing this result. Certain features, however of the particular form shown are not of my invention, but are claimed in a patent to Samuel Ferguson No. 791,547.

What I claim as new and desire to secure by Letters Patent of the United States, is,

1. The combination of a vapor electric rectifier, a translating device in the direct current circuit thereof, and means automatically operative on a reduction of current in said device for lowering the total resistance of the direct current circuit.

2. The combination of a vapor electric rectifier, a translating device in the direct current circuit thereof possessing counter-electromotive force, and automatic means for shunting said device by a current-carrying means when the counter-electromotive force becomes excessive.

3. A vapor electric rectifier, and automatic load-varying means for maintaining the total conductance of the direct current circuit of the rectifier high enough to prevent the current from falling below a value necessary to secure stable operation of the rectifier.

4. The combination of a vapor rectifier, and load-varying means responsive to current in the rectified circuit for securing stable operation of the rectifier.

5. The combination of a vapor rectifier, a device possessing counter-electromotive force connected in the rectified circuit, and means for automatically shunting said device upon decrease of current in the rectified circuit.

6. The combination of a vapor electric apparatus adapted to be started by shaking or tilting, means for producing a continuous oscillation or tilting of said apparatus, and automatic means operating only after the apparatus has been started for discontinuing said oscillation.

7. The combination of a vapor electric apparatus, a lever carrying circuit-making and breaking contacts, spring supported electromagnetic means controlling the operation of said contacts and energized by the rectified load current from said apparatus, and circuits controlled by said contacts, one of said circuits being connected to an electromagnetic device for tilting or oscillating said apparatus, another being connected to a translating device in circuit with said apparatus and another to a resistance.

8. The combination of a rectifier, electromagnetic means for tilting or shaking the rectifier, a starting circuit for the rectifier, a translating device or devices fed by the rectifier, a circuit possessing resistance, and an electromagnetically-actuated device for controlling the shaking or tilting of the rectifier, for controlling the starting circuit of the rectifier and for connecting the circuit containing resistance in shunt with the translating device or devices.

9. The method of securing stable operation of a vapor electric rectifier feeding a device possessing counter-electromotive force, which consists in automatically reducing the counter-electromotive force whenever a tendency toward instability of the rectifier appears.

10. The method of securing stable operation of a vapor rectifier feeding a translating device, which consists in automatically increasing the current-consuming capacity of the consumption circuit whenever a tendency toward instability occurs.

11. The combination of a rectifier, an alternating supply circuit therefor, a starting device for the rectifier operative by current from a source other than the alternating current supply source, and means for rendering the starting device inoperative whenever the alternating current supply mains are unenergized.

12. In a system of electrical distribution in which vapor electric apparatus is utilized to supply energy derived from an alternating current source against a counter electromotive force, such as a storage battery, the method which consists in opening the work circuit automatically when the alternating current supply ceases and substituting therefor a circuit containing a resistance.

13. The combination of a source of current, a mercury vapor device, connections for supplying current from said source to the main arc path of said device during normal operation, a steadying resistance in circuit with said main arc path at starting, and automatic means for opening the circuit through said resistance while maintaining current flow through said device by way of said connections.

14. The combination of a rectifier, an alternating current supply circuit connected thereto, a circuit connected to the cathode for carrying rectified current, a load device in said circuit and means actuated by a variation of current in said cathode circuit for automatically varying the impedance of said circuit.

In witness whereof, I have hereunto set my hand this fifteenth day of January, 1904.

ALEXANDER CHURCHWARD.

Witnesses:
   L. C. Foss,
   M. A. Oudin.